(12) United States Patent
Ljunggren et al.

(10) Patent No.: US 11,226,682 B2
(45) Date of Patent: Jan. 18, 2022

(54) LENS FOR EYE-TRACKING AND DEVICE WITH SUCH A LENS

(71) Applicant: Tobii AB, Danderyd (SE)

(72) Inventors: Daniel Ljunggren, Danderyd (SE); Anders Höglund, Danderyd (SE); Axel Tollin, Danderyd (SE); Jan Skagerlund, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/778,445

(22) Filed: Jan. 31, 2020

(65) Prior Publication Data

US 2020/0393897 A1 Dec. 17, 2020

(51) Int. Cl.
*G06F 3/01* (2006.01)
*G02B 27/01* (2006.01)
*G02B 27/00* (2006.01)

(52) U.S. Cl.
CPC .......... *G06F 3/013* (2013.01); *G02B 27/0093* (2013.01); *G02B 27/0172* (2013.01); *G02B 2027/0178* (2013.01)

(58) Field of Classification Search
CPC ........... G06F 3/013; G06F 3/042–0428; A61B 3/113; A61B 5/6803; A61B 5/163; A61B 3/14; G02B 3/013; G02B 27/017; G02B 2027/0138; G02B 2027/0178; G02B 2027/0187; G02B 27/0172; G02B 30/35; G02B 5/30
See application file for complete search history.

(56) References Cited

U.S. PATENT DOCUMENTS 10,546,430 B1\* 1/2020 Lu ........................... G06F 3/016
2019/0163267 A1\* 5/2019 Hainzl ............... G02B 27/0977

\* cited by examiner

*Primary Examiner* — Sanjiv D. Patel
(74) *Attorney, Agent, or Firm* — Samuel I. Yamron

(57) ABSTRACT

A lens for eye tracking applications is described. The lens comprises a first protective layer with a first surface, arranged to face towards the eye to be tracked when the lens is used for eye tracking. The lens is characterized in that the lens further comprises a supporting layer and a second protective layer with a second surface, arranged to face away from the eye to be tracked when the lens is used for eye tracking. The supporting layer is arranged between the first protective layer and the second protective layer, and the supporting layer comprises at least a first opening between the first protective layer and the second protective layer. At least one electrical component arranged extending through the first opening.

20 Claims, 3 Drawing Sheets

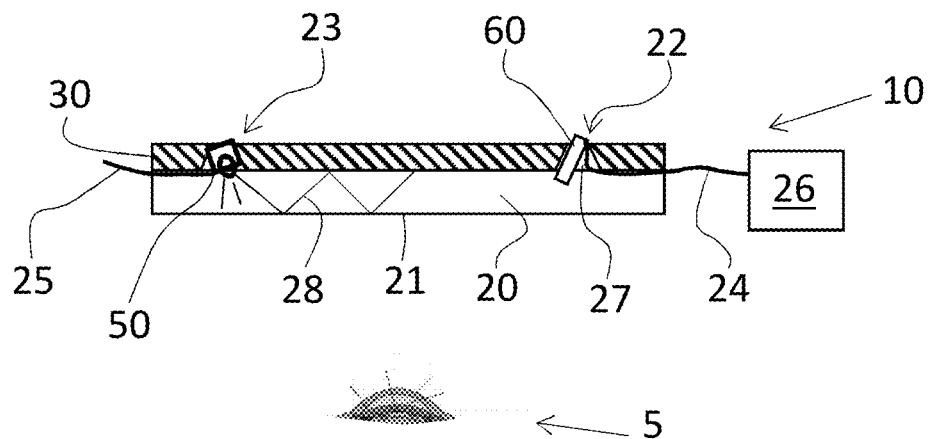
Fig. 3
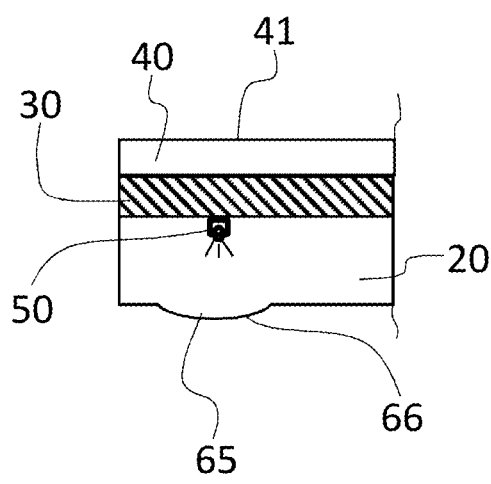 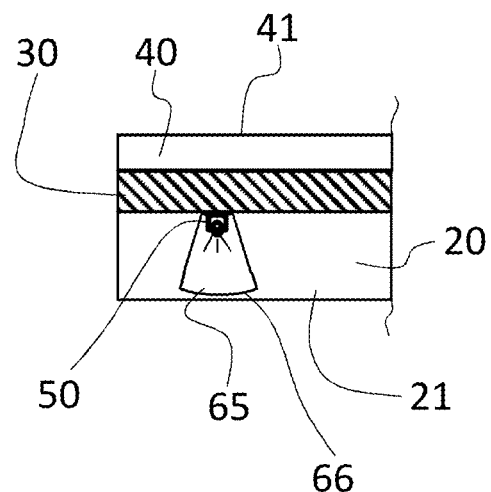
Fig. 4a    Fig. 4b

LENS FOR EYE-TRACKING AND DEVICE WITH SUCH A LENS

CROSS-REFERENCES TO RELATED APPLICATIONS

This application claims priority to Swedish Application No. 1950117-0, filed Jan. 31, 2019; the content of which are hereby incorporated by reference.

TECHNICAL FIELD

The present disclosure relates to a lens for eye-tracking applications comprising at least one electrical component such as a light source and an image capturing device. The present disclosure also relates to a head-worn device comprising such a lens.

BACKGROUND ART

Eye-tracking is a term for the process of measuring either the point of gaze or the motion of an eye relative to the head. An eye-tracker is a term for a device for measuring eye positions and eye movement. Eye-trackers are commonly used in several fields of research and development, such as physiologically on the visual system, in psychology, in psycholinguistics, marketing, as an input device for human-computer interaction and in product design. There are presently a number of methods for measuring eye movement. One of the emerging variants thereof uses video images from which the eye position is extracted.

Eye-trackers are generally adapted to measure rotations of the eye in one of several ways, but principally they fall into three main categories: measurement of the movement of an object in contact with the eye, optical tracking without direct contact to the eye and measurement of electric potentials using electrodes placed around the eyes.

The optical tracking category mentioned above uses some of the available non-contact, optical methods for measuring eye motion. Emitted light, typically in the infrared wavelength region, is reflected from the eye and sensed by a video camera or some other specially designed optical sensor. The sensed information is then analysed in real time to extract eye movements from changes in reflections.

In conventional head-worn eye-tracking devices, electro-optical components, such as one or more cameras and/or light sources, are usually mounted on a mechanical support structure. Most convenient and a classic solution is to have at least partly covered the frame of a pair of glasses with the mentioned structure onto which the necessary components have been mounted.

An example of such a solution is disclosed in U.S. Pat. No. 9,665,172, which describes a portable eye-tracking device including a frame having a glasses lens attached thereon with, so as to, to the greatest possible extent, resemble a traditional pair of eye-glasses or sunglasses. The frame includes a centrepiece to which the glasses lens is attached and from which sidepieces extend. These sidepieces may fit above the ear of a user in the manner of a traditional pair of eye-glasses or sun glasses. A nose piece is provided for comfort and to assist in fitting of the device to a user's nose. A scene camera, which may capture still and/or video images and/or other image data, is disposed in the glasses lens above the nose piece. To record sound, a microphone may also be placed adjacent or near to the scene camera. A control unit is located within one or both arms (sidepieces).

To the frame is attached a mechanical support structure with optics holding members, usually fixated to the frame of the portable eye-tracking device. The mechanical support structure with optics holding members usually constitutes a visibly and physically obstructive element to the user. This support structure may be perceived as disturbing and less attractive both from functional and esthetical points of view. Mounting fragile and sometimes very sensitive optical and/or electronic components on an extending frame structure may also be undesired from the perspective of strength and durability of the lens and its functional elements, all of which are crucial for a robust and reliable function of an eye-tracking device.

Moreover, at least to date, since eye-tracking technology is now emerging, prior art solutions have not been optimised in terms of cost and efficiency when setting up production facilities for producing eye-tracking devices in a large scale.

SUMMARY OF THE INVENTION

An object of the present invention is to at least alleviate one of the problems with the prior art.

Another object of the present invention is to reduce the weight of equipment attached on the outside of the lens.

At least one of these objects is fulfilled with a lens according to an the independent claim directed to a lens.

Further advantages are achieved with the features of the dependent claims.

According to a first aspect of the invention a lens is provided for eye tracking applications, the lens comprising a first protective layer with a first surface, arranged to face towards the eye to be tracked when the lens is used for eye tracking. The lens is characterized in that it further comprises a supporting layer; and a second protective layer with a second surface, arranged to face away from the eye to be tracked when the lens is used for eye tracking. The supporting layer is arranged between the first protective layer and the second protective layer, and the supporting layer comprises at least a first opening between the first protective layer and the second protective layer. The lens further comprises an electrical component arranged extending through the first opening.

With the lens according to the invention the incorporation of an electrical component into the lens is facilitated. During manufacturing of the lens the electric component may be arranged extending through the supporting layer. The first protective layer and the second protective layer may then be formed on opposite sides of the supporting layer. The electrical component then becomes correctly positioned in the lens.

The lens may be used in devices for augmented reality (AR) as well as in devices for virtual reality (VR). Especially in VR applications it is preferable if the lens is flat as it is to be combined with a display which in most cases is flat. It is however possible to make the lens with a curved surface.

The size of the at least one opening may be arranged to provide support for the electrical component during manufacturing of the lens. According to a preferred embodiment this is achieved by making the opening with slightly larger dimensions than the electrical component, which is to be arranged in the opening. After the arrangement of the electrical device in the opening an optically transmitting material may be arranged between the supporting layer and the electrical component to fix it in relation to the supporting layer. The first protective layer and the second protective layer may then be formed on opposite sides of the supporting layer. As an alternative the first opening may be formed with slightly smaller dimensions than the electrical component. In this way a press fitting is achieved. With a press fitting the forming of the opening must be done with tight tolerances.

Said electrical component may be an image capturing device, arranged to receive light from the eye to be tracked when the lens is used for eye tracking. It is advantageous to have the image capturing device incorporated in the lens. In this way as the problem of arranging an image capturing device on the lens is then avoided. The image capturing device may be comprise any suitable image sensor, such as, e.g., a CMOS sensor and a CCD. The image capturing device may also comprise optical elements to form an image on the image sensor.

The image capturing device may be in contact with the first protective layer. If no special measures are taken the image capturing device will be in contact with the first protective layer. It is preferred that the image capturing device extends into the first protective layer.

The lens may comprise a light source arranged to emit light into the first protective layer, which light exits the first protective layer from the first surface and is directed towards the eye to be tracked when the lens is used for eye tracking. With a light source incorporated into the lens in this way, the problem of arrangement of a light source on the outside of the lens is avoided.

The supporting layer may comprise a second opening between the first protective layer and the second protective layer, wherein the light source is arranged to extend through the second opening. This arrangement may be favourable for some applications and may facilitate the arrangement of the light source in the correct desired angle in relation to the first surface.

The light source is preferably a light emitting diode, LED, or a laser. The light source preferably emits light in a narrow wavelength band. The image capturing device is preferably arranged to detect light in said wavelength band. It is preferred that the wavelength band is in the near infrared wavelength region. With the light in that wavelength region the light does not disturb the user of the lens. The wavelength band in which the light source emits light may typically be in the range 800-1000 nm. By having the image capturing device detecting light only in the wavelength region in which the light source emits light, the quality of the eye tracking is improved.

The light source may be arranged with a predetermined angle in relation to the first surface, so that the light, emitted from the light source, is directed towards the cornea of the eye to be tracked when the lens is used for eye tracking. By such a direction of the light from the light source, the eye tracking may be optimized, as it is favourable to track the cornea of the eye.

The image capturing device may be arranged with a predetermined angle in relation to the first surface, such that the image capturing device is arranged to receive light reflected from the cornea of the eye to be tracked when the lens is used for eye tracking. By having the image capturing device arranged in this way, the eye tracking may be optimized, as it is primarily the cornea that is illuminated.

The lens may comprise a first cable connected to the image capturing device, wherein the cable extends from the image capturing device, between the supporting layer and the first surface or the second surface to the outside of the lens, to enable connection of the image capturing device to a control unit by means of the first cable. With such an arrangement of the first cable it is secured in lens and cannot move in the field of view of the user of the lens.

The first cable may be arranged in contact with the supporting layer. This facilitates the manufacturing of the lens as the first cable is then secured to the supporting layer before formation of the first protective layer and the third protective layer.

The lens may comprise a second cable connected to the light source, wherein the second cable extends from the light source, between the supporting layer and the first surface or the second surface to the outside of the lens, to enable connection of the light source device to a control unit by means of the second cable. The arrangement of also the second cable in this way has the same advantages as the arrangement of the first cable in the same way.

The second cable may be arranged in contact with the supporting layer. This facilitates the manufacturing of the lens as the second cable is then secured to the supporting layer before formation of the first protective layer and the second protective layer. This has the same advantages as mentioned above for the first cable.

The material in the first protective layer and/or the second protective layer may be a polymer. A polymer may be formed on the supporting layer without negatively affecting the electrical component.

The material in the supporting layer may be a polymer. A polymer is favourable for combination with the first and third protective layers of polymer.

At least some of the objectives are according to an aspect of the present disclosure also achieved by a head-worn device. The head-worn device comprises at least one lens for eye-tracking applications according to the present disclosure. The head-worn device has the advantages discussed in relation to the lens.

The head-worn device may be an augmented reality headset, where a transparent display is either integrated into the lens, attached to the lens or arranged in the vicinity of the lens.

The head-worn device may alternatively be a virtual reality headset, comprising a display wherein the lens is either integrated into the display, attached in front of the display or arranged in front of the display.

It should be emphasised that any of the above-described embodiments can be combined. Combinations of these embodiments might provide additional advantages. Further advantages might arise when putting the disclosure into practice or when studying the following detailed description.

BRIEF DESCRIPTION OF THE DRAWINGS

For a more detailed understanding of the present invention and its objects and advantages, reference is made to the following detailed description, which should be read together with the accompanying drawings. Same reference numbers refer to same components in the different figures.

FIG. 3 depicts schematically a lens according to an alternative embodiment to the present disclosure.

FIGS. 4a and 4b shows in an enlarged view a part of the lens and the light according to two alternative embodiments.

DETAILED DESCRIPTION

Figure 1:
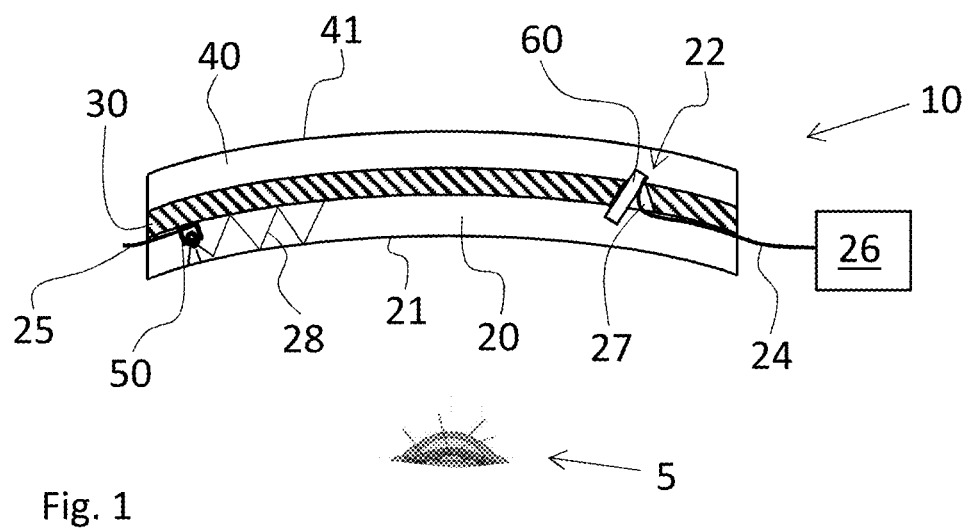
FIG. 1 depicts schematically a lens according to an embodiment of the present disclosure.

FIG. 1 depicts schematically a lens 10 according to an embodiment of the present disclosure. The lens 10 is particularly arranged and intended for eye-tracking applications. The lens comprises a first protective layer 20, arranged to face towards the eye 5 to be tracked when the lens 10 is used for eye-tracking, wherein the first protective layer comprises a first surface 21, arranged to face towards the eye 5 to be tracked when the lens 10 is used for eye-tracking. The first surface 21 may have the shape of a first non-zero curvature.

The lens 10 also comprises a supporting layer 30. The supporting layer 30 is arranged to face away from the eye 5 to be tracked when the lens is used for eye-tracking. Further, the lens 10 may comprise a second protective layer 40 with a second surface 41 arranged to face away from the eye 5 to be tracked when the lens is used for eye-tracking. In this case, the supporting layer 30 is arranged between the first protective layer 20 and the second protective layer 40.

In one example, the supporting layer comprises a first opening 22 between the first protective layer 20 and the second protective layer 40. An electrical component in the form of an image capturing device is arranged extending through the first opening 22. The first opening 22 may have a larger dimension than the image capturing device 60. This allows the angle of the image capturing device 60 to be adjusted during manufacturing of the lens 10. The arrangement of the image capturing device 60 is performed before the arrangement of the first protective layer 20 and the second protective layer 40. After arrangement of the image capturing device in the first opening 22 an optically transmitting adhesive 27 may be applied to fill out the remainder of the first opening. A first cable 24 is connected to the image capturing device 60. The first cable 24 may extend from the imaging device 60 in contact with the supporting layer between the supporting layer and the first surface 21 to the outside of the lens 10. This enables connection of the image capturing device 60 to a control unit 26.

The image capturing device 60 comprises an image sensor, such as a CMOS sensor or CCD sensor; RGB colour sensor; infrared sensor or similar. The image capturing device 60 also comprises any necessary optical elements for focusing of the incident light from the eye 5. The first protective layer 20 and the second protective layer 40 of the lens 10 consists of materials such as glass and/or one or several polymers, comprising for example plastic, acrylic glass, polycarbonate, polyethylene terephthalate or polyepoxides. The supporting layer 30 may comprise a suitable polymer. Examples of materials for the different layers 20, 30, 40, 70, include: glass and/or one or several polymers, comprising for example plastic, acrylic glass, polycarbonate, polyethylene terephthalate or polyepoxides.

The thickness of the first protective layer 20 may be in the range 50-2000 μm, preferably in the range 100-1500 μm, more preferably in the range 100-1000 μm, and most preferred in the range 100-500 μm.

The lens 10 also comprises a light source 50, which in the embodiment shown in FIG. 1 is attached to the supporting layer 30 and is arranged within the first protective layer 20. The light source 50 is arranged to emit a first light through the first surface 21 towards the eye 5, and most preferably towards the cornea of the eye 5. The image capturing device 60 is directed towards the eye 5 and most preferably towards the cornea of the eye to capture the first light. In order to achieve a clear signal the light source 50 is arranged to emit light in a specific wavelength band, and the image capturing device 60 is arranged to capture light in the same wavelength band. The light source 50 may be adapted to emit the first light essentially at wavelengths in the wavelength range 650-3000 nm, preferably in the wavelength range 750-1400 nm, more preferably in the wavelength range 800-1000 nm. The image capturing device 60 captures images of the eye during movement of the eye in order the track the movement of the eye in a manner known per se from prior art eye-tracking systems.

Due to the higher refractive index of the material in the first protective layer compared to the refractive index of the air on the outside of the first surface 21 some of the first light will be subject to total internal reflection as is shown by the line 28. If the first light reaches the image capturing device it will deteriorate the image captured by the image capturing device 60. In order to avoid that some of the first light reaches the image capturing device 60 the supporting layer 30 may be adapted to be absorptive for the majority of wavelengths of the first light. In other words, if the first light is in a wavelength band, e.g., in the range 750-1400 nm, the absorptive layer should be adapted to be absorptive in the same wavelength band. As an example, if the light source 50 emits light at a wavelength around 900 nm the absorptive the supporting layer 30 is adapted to be absorptive at least around 900 nm. This will prevent the first light from reaching the image capturing device 60. The supporting layer is preferably transparent at visible wavelengths to enable for a user to look through the lens 10. The supporting layer 30 of the lens 10 may be provided with an absorbing dye, in order to absorb the first light. As an alternative the second protective layer 40, instead of the supporting layer 30, may function as an absorptive layer. Thus, the second protective layer 40 of the lens 10 may be provided with an absorbing dye, in order to absorb the first light, while transmitting visible light.

The lens 10 also comprises a second cable 25 connected to the light source. The second cable 25 may extend from the light source 50, between the supporting layer 30 and the first surface 21 in contact with the supporting layer 30, to the outside of the lens 10. The second cable 25 may be connected to the control unit 26.

The control unit 26 controls the light source 50 and the image capturing device and may be adapted to communicate with other equipment, such as a computer, by wire or wirelessly. The first cable 24 and the second cable 25 provide data and/or power supply. The data and/or power supply is preferably connected to the potential of the light source and/or the image capturing device, such as a camera.

Figure 2:
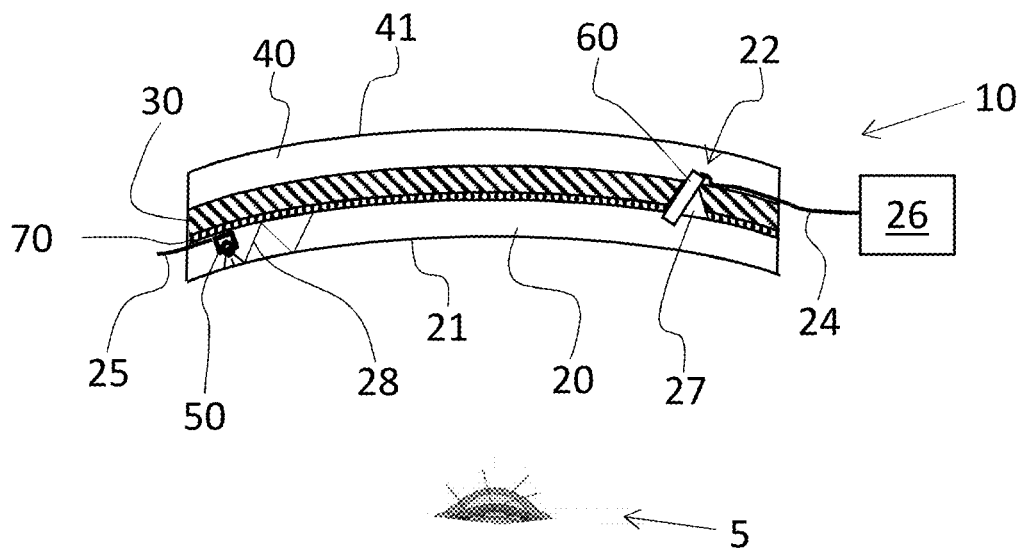
FIG. 2 depicts schematically a lens according to an alternative embodiment to the present disclosure.

FIG. 2 depicts schematically a lens according to an alternative embodiment to the present disclosure. One difference compared to the lens 10 shown in FIG. 1 is that the lens 10 of FIG. 2 is that the lens in FIG. 2 comprises a separate absorptive layer 70. The absorptive layer 70 is adapted to be absorptive for the wavelengths of the first light emitted by the first light source 50. Both the supporting layer 30 and the absorptive layer 70 are essentially transparent for visible wavelengths to allow a user to look through the lens. In FIG. 2 the first cable 24 is arranged on the other side of the supporting layer 30 compared to the lens 10 in FIG. 1, i.e., between the supporting layer 30 and the second surface 41. The absorptive layer 70 is provided with an absorbing dye, in order to absorb the first light, which has been reflected by total internal reflection. It is possible to have the absorptive layer 70 and the supporting layer 30 in the other order, i.e., to have the supporting layer 30 between the absorptive layer 70 and the first protective layer 20. The second protective layer 40 provides a protection for the back of the image capturing device 60.

FIG. 3 shows schematically a lens according to an alternative embodiment to the present disclosure. In FIG. 3 the lens 10 comprises only a first protective layer 20 and a supporting layer 30. The supporting layer 30 is an absorptive layer adapted to absorb the part of the first light, which is reflected in total internal reflection. The lens in FIG. 3 may comprise a second opening 23. The light source is arranged to extend through the second opening. The second opening increases the possibility to adjust the direction of the first light. The lens 10 may be flat. This embodiment is especially interesting when the invention is used in VR headsets. VR headset may or may not comprise a separate lens. Thus, potentially the lens 10 in FIG. 3 could be the display.

The lens including all of its layers has a thickness in the range of 1-10 mm, preferably 3-5 mm. It is possible to have the lens even thicker, but the weight of the lens might become an issue then. It may also be possible to produce the lens thinner than 1 mm if future image capturing devices exhibit smaller dimensions than the present image capturing devices.

FIGS. 4 a and 4b FIGS. 4a and 4b shows in an enlarged view a part of the lens 10 and the light source 50 according to two alternative embodiments. The light source may be for example be a light emitting diode, LED, or a laser. Most light emitting diodes LEDs currently available on the market are produced from materials with a refractive index close to the refractive index of the material of the first protective layer in which the light emitting diode is to be arranged. The focussing function provided by the dome shape of the lens gets lost and is therefore in an alternative embodiment replaced by the dome-shaped micro lens, a lens that is attached onto the first surface 21 on the first protective layer 20. The lens 10 has the dual function of focussing the first light emitted from the light source 50 and reducing internal reflection. This is shown in FIG. 4a. As can be seen in FIG. 4a where a refractive element 65 is arranged in front of the light source 50. The refractive element 65 has a curved surface 66. The refractive element 65 may be integral with the first protective layer 20 or be attached to the outside of the first protective layer 20. The refractive element preferably has the same refractive index as the first protective layer 20. The curved surface 66 of the refractive element 65 has, seen from the light source 5, a convex shape, such that the emission cone of the first light is emitted onto the curved surface 66 with an angle of incidence, which relative to the curved surface 66 is smaller than the critical angle at which total internal reflection would occur. Thus, because stray light with large angles of incidence in relation to the inner surface of the lens are reduced, internal reflections are minimised. In other words, less light will fall on the inner surface with an angle of incident larger than the critical angle, due to the curved surface 66 of the 65 refractive element 65.

FIG. 4b shows an alternative embodiment with a refractive element that narrows the emission cone from the at least one light source 50. The refractive element 65 is integral with the first protective lens 20 so that it does not protrude out of the first surface 21. The refractive element 65 has a curved surface 66. The refractive element 65 may have a refractive index that is 15-100% higher than the refractive index of the first protective layer 20. Preferably, the refractive element 65 may have a refractive index that is 30-50% higher than the refractive index of the first protective layer 20. The curved surface 66 of the refractive element 65 has, seen from the light source 5, a convex shape, such that the emission cone of the first light is emitted onto the curved surface 66 with an angle of incidence, which relative to the curved surface 66 is smaller than the critical angle at which total internal reflection would occur.

Figure 5A:
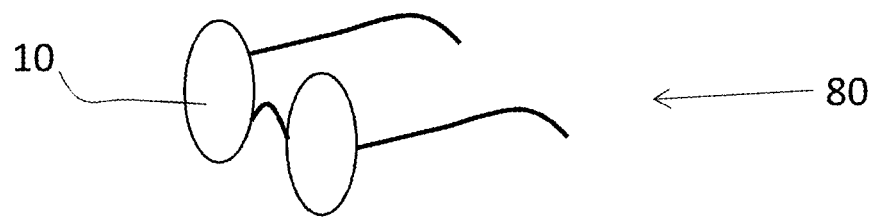
FIGS. 5a, 5b and 5c depicts schematically different embodiments of head-worn devices according to the present disclosure.
Figure 5B:
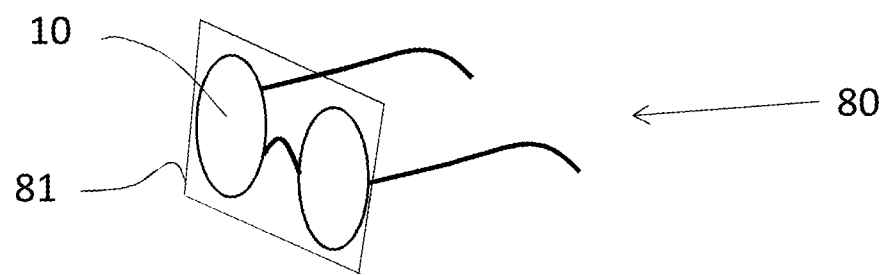
Figure 5C:
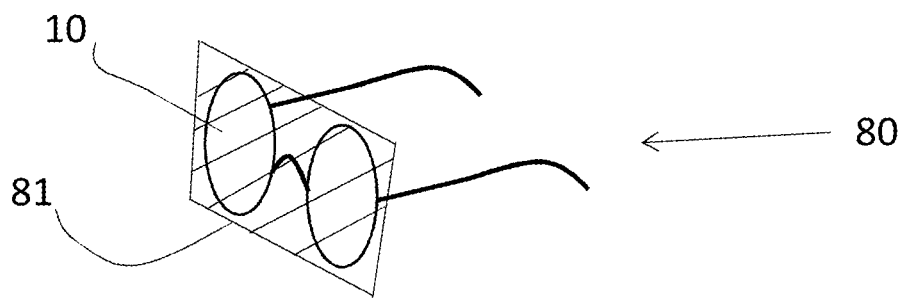

FIG. 5 depicts schematically different embodiments of a head-worn device 80 according to an embodiment of the present disclosure. The head-worn device 80 can be glasses (FIG. 5a) for eye-tracking (without display); an augmented reality headset (FIG. 5b), where a transparent display 81 is either integrated into the lens, attached to the lens or arranged in the vicinity of the lens; or a virtual reality headset (FIG. 5c), comprising a display 81 wherein the lens is either integrated into the display, attached in front of the display or arranged in front of the display.

The described embodiments may be amended in many ways without departing from the scope of the present invention, which is limited only by the appended claims.

The invention claimed is:

1. A lens for eye tracking applications, the lens comprising:
   a first protective layer with a first surface, arranged to face towards the eye to be tracked when the lens is used for eye tracking, wherein the lens further comprises:
   a supporting layer; and
   a second protective layer with a second surface, arranged to face away from the eye to be tracked when the lens is used for eye tracking,
   wherein the supporting layer is arranged between the first protective layer and the second protective layer, and wherein the supporting layer comprises at least a first opening between the first protective layer and the second protective layer; and
   wherein an electrical component is arranged extending through the first opening.

2. The lens according to claim 1, wherein the size of the at least one opening is arranged to provide support for the electrical component during manufacturing of the lens.

3. The lens according to claim 1, wherein said electrical component is an image capturing device, arranged to receive light from the eye to be tracked when the lens is used for eye tracking.

4. The lens according to claim 3, wherein the image capturing device is in contact with the first protective layer.

5. The lens according to claim 3, wherein the lens comprises a light source arranged to emit a first light into the first protective layer, which light exits the first protective layer from the first surface and is directed towards the eye to be tracked when the lens is used for eye tracking.

6. The lens according to claim 5, wherein the supporting layer comprises a second opening between the first protective layer and the second protective layer, and wherein the light source is arranged to extend through the second opening.

7. The lens according to claim 5, wherein the light source is arranged with a predetermined angle in relation to the first surface, so that the light, emitted from the light source, is directed towards the cornea of the eye to be tracked when the lens is used for eye tracking.

8. The lens according to claim 7, wherein the image capturing device is arranged with a predetermined angle in relation to the first surface, such that the image capturing device is arranged to receive light reflected from the cornea of the eye to be tracked when the lens is used for eye tracking.

9. The lens according to any one of claim 3, comprising a first cable connected to the image capturing device, wherein the first cable extends from the image capturing device, between the supporting layer and the first surface or the second surface, to the outside of the lens, to enable connection of the image capturing device to a control unit by means of the first cable.

10. The lens according to claim 9, wherein the first cable is arranged in contact with the supporting layer.

11. The lens according to claim 3, further comprising:
   comprises a light source arranged to emit a first light into the first protective layer, which light exits the first protective layer from the first surface and is directed towards the eye to be tracked when the lens is used for eye tracking;
   a first cable connected to the image capturing device, wherein the first cable extends from the image capturing device, between the supporting layer and the first surface or the second surface, to the outside of the lens, to enable connection of the image capturing device to a control unit by means of the first cable; and
   a second cable connected to the light source, wherein the second cable extends from the light source, between the supporting layer and the first surface or the second surface, to the outside of the lens, to enable connection of the light source device to a control unit by means of the second cable.

12. The lens according to claim 11, wherein the second cable is arranged in contact with the supporting layer.

13. The lens according claim 1, wherein the material in the first protective layer and/or the second protective layer is any of: glass and/or one or several polymers, comprising for example plastic, acrylic glass, polycarbonate, polyethylene terephthalate or polyepoxides.

14. A head-worn device, having eye-tracking capability comprising:
   a lens for eye tracking applications, wherein the lens has a first protective layer with a first surface, arranged to face towards the eye to be tracked when the lens is used for eye tracking, a supporting layer, and a second protective layer with a second surface, arranged to face away from the eye to be tracked when the lens is used for eye tracking;
   wherein the supporting layer is arranged between the first protective layer and the second protective layer, and wherein the supporting layer comprises at least a first opening between the first protective layer and the second protective layer; and
   wherein an electrical component is arranged extending through the first opening.

15. The head-worn device according to the claim 14, wherein the head-worn device is an augmented reality headset, where a transparent display is either integrated into the lens, attached to the lens or arranged in the vicinity of the lens.

16. The head-worn device according to the claim 14, wherein the head-worn device is a virtual reality headset, comprising a display wherein the lens is either integrated into the display, attached in front of the display or arranged in front of the display.

17. An eye-tracking system comprising:
   A lens for eye tracking applications, the lens having:
   a first protective layer with a first surface, arranged to face towards the eye to be tracked when the lens is used for eye tracking, wherein the lens further comprises:
   a supporting layer; and
   a second protective layer with a second surface, arranged to face away from the eye to be tracked when the lens is used for eye tracking,
   wherein the supporting layer is arranged between the first protective layer and the second protective layer, and wherein the supporting layer comprises at least a first opening between the first protective layer and the second protective layer; and
   wherein an electrical component is arranged extending through the first opening.

18. The eye-tracking system according to claim 17, wherein the size of the at least one opening is arranged to provide support for the electrical component during manufacturing of the lens.

19. The eye-tracking system according to claim 17, wherein said electrical component is an image capturing device, arranged to receive light from the eye to be tracked when the lens is used for eye tracking.

20. The eye-tracking system according to claim 9, further comprising:
   comprises a light source arranged to emit a first light into the first protective layer, which light exits the first protective layer from the first surface and is directed towards the eye to be tracked when the lens is used for eye tracking;
   a first cable connected to the image capturing device, wherein the first cable extends from the image capturing device, between the supporting layer and the first surface or the second surface, to the outside of the lens, to enable connection of the image capturing device to a control unit by means of the first cable; and
   a second cable connected to the light source, wherein the second cable extends from the light source, between the supporting layer and the first surface or the second surface, to the outside of the lens, to enable connection of the light source device to a control unit by means of the second cable.

* * * * *